March 30, 1954  W. A. NORRIS  2,673,747
FIFTH WHEEL SAFETY HITCH
Filed Feb. 1, 1952 2 Sheets-Sheet 1
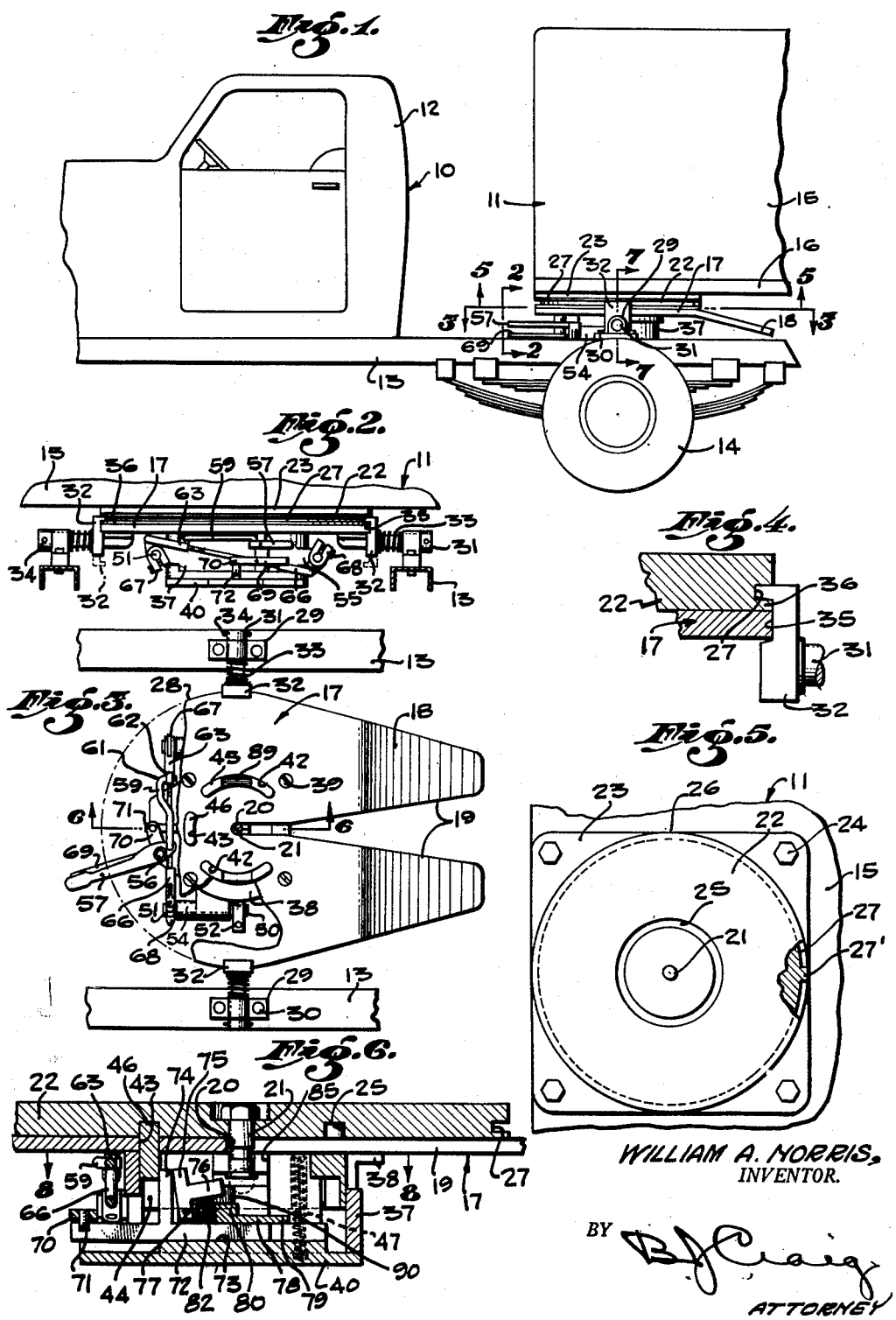
WILLIAM A. NORRIS,
INVENTOR.
ATTORNEY March 30, 1954   W. A. NORRIS   2,673,747
FIFTH WHEEL SAFETY HITCH
Filed Feb. 1, 1952   2 Sheets-Sheet 2
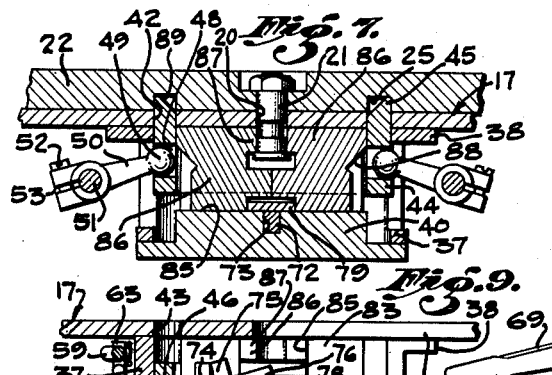
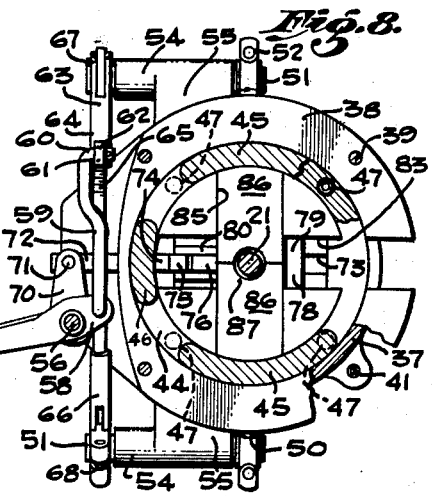
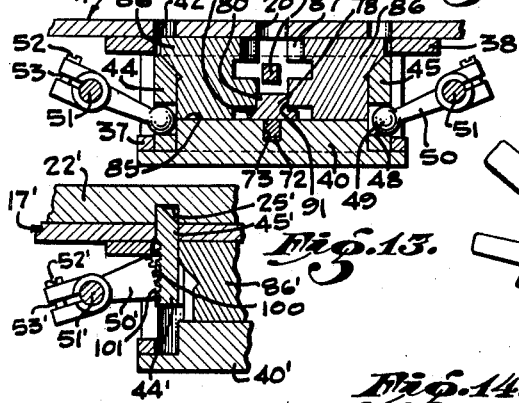
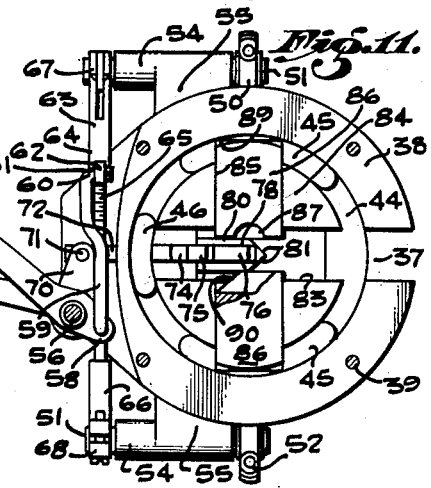
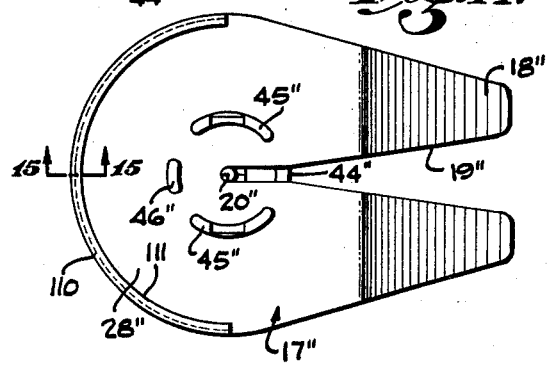
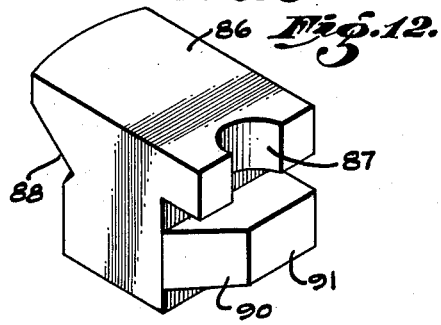
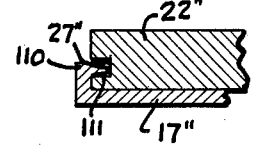
WILLIAM A. NORRIS,
INVENTOR.
BY B. J. Craig
ATTORNEY Patented Mar. 30, 1954

2,673,747

UNITED STATES PATENT OFFICE 2,673,747

FIFTH WHEEL SAFETY HITCH

William A. Norris, Alhambra, Calif.

Application February 1, 1952, Serial No. 269,400

5 Claims. (Cl. 280—432)

This invention relates to a fifth wheel safety hitch.

The general object of the invention is to provide a novel fifth wheel coupling device by means of which a truck and trailer combination may be coupled together.

A further object of the invention is to provide novel coupling means which is effective should the king pin break to maintain a swiveling relation between the truck and trailer.

A further object of the invention is to provide a novel fifth wheel safety hitch including a support and turntable of novel construction and wherein the parts are so made that either the support or the turntable may be used with conventional equipment.

A further object of the invention is to provide novel means for swivelling the turntable on the support in a tractor trailer hitch.

A further object of the invention is to provide a novel anti-jackknifing means for a tractor trailer coupling.

Other objects and the advantages of my invention will be apparent from the following description taken in connection with the accompanying drawings, wherein:

Fig. 1 is a side elevational view showing my improved fifth wheel as applied to a truck and trailer;

Fig. 2 is a front elevation view of the fifth wheel taken on line 2—2, Fig. 1;

Fig. 3 is a top plan view taken on line 3—3, Fig. 1;

Fig. 4 is an enlarged fragmentary detail view showing a portion of the support mechanism;

Fig. 5 is a bottom plan view of the turntable taken as indicated by line 5—5, Fig. 1;

Fig. 6 is an enlarged longitudinal sectional view taken as indicated by line 6—6, Fig. 3;

Fig. 7 is a transverse sectional view taken substantially as indicated by line 7—7, Fig. 1;

Fig. 8 is a view, partially in section, taken as indicated by line 8—8, Fig. 6;

Fig. 9 is a sectional view similar to Fig. 6 and showing the mechanism in an unlatched position;

Fig. 10 is a sectional view similar to Fig. 7 and showing the mechanism also in an unlatched position;

Fig. 11 is a view similar to Fig. 8, again showing the mechanism in an unlatched position;

Fig. 12 is an isometric view showing one of the locking dogs;

Fig. 13 is a fragmentary sectional view similar to a portion of Fig. 7 and showing a modification of the invention;

Fig. 14 is a view similar to Fig. 3 and showing another modification of the invention; and Fig. 15 is a fragmentary sectional view taken on line 15—15, Fig. 14.

Referring to the drawing by reference characters, my invention is shown as applied to a tractor and trailer arrangement, wherein the tractor is indicated generally at 10. As shown, the tractor includes a cab 12 arranged on a frame 13 and supported at the rear by wheels 14. The trailer 11 includes a body 15 mounted on a frame 16.

On the tractor, above the rear wheels 14, I arrange a fifth wheel support plate 17. As shown, this support plate is mounted in the usual manner upon the tractor and has rearwardly and downwardly inclined spaced sides 18 which form a tapering guideway 19. The guideway terminates in a semi-circular portion 20 which receives a spool-shaped king pin 21 which is carried by and projects below a turntable 22 which engages the surface of the fifth wheel support 17 for rotation about the axis of the king pin 21. The turn table 22 is connected to and supported by a plate 23 which is shown as rectangular and is secured to the tractor by bolts 24.

The turntable 22 is shown as mounted upon the trailer member 11 and the support 17 is shown as mounted upon the tractor 10 but it will be understood that this arrangement may be reversed without departing from the spirit of my invention.

The turntable 22 includes a circular groove 25 which is coaxial with the king pin 21. The turntable has a circular periphery 26 and I provide a groove 27 in this periphery. The groove 27 extends entirely about the turntable 22.

The forward edge 28 of the support 17 is semi-circular and has a radius substantially equal to the radius of the turntable 22.

At each side of the support 17 I provide brackets 29 which are secured by fastening members 30 to the frame 13 of the tractor. Each bracket 29 supports a shaft 31. Each shaft carries a fixed guide member 32 which is normally urged towards the support 17 by a spring 33.

A pin 34 limits the movement towards the support 17 of the guide member 32 by the spring 33. Each guide member 32 is provided with a slot 35 (see Figs. 2 and 4). The slot 35 faces towards the support 17 and is of a width sufficient to receive the edge of the support 17 and also to receive the lower flange 36 of the turntable 22 which is defined by the groove 27, previously mentioned.

As a result of the above described construction, when the king pin 21 is fully advanced in the guideway 19, as shown in Fig. 3, the guide member slot 35 will receive the flange 36 on the turntable 22 and will rotatably support this flange and the turntable. The turntable groove 27 is interrupted at diametrically opposed locations, namely at 27', as shown in Fig. 5, so that should the trailer 15 swing through more than 90° from a straight back position, each of the interrupted parts 27' would engage one of the guide members 32 to thus prevent jackknifing of the truck and trailer.

My safety hitch is adapted for use with conventional constructions wherein the turntable part merely carries a bearing area and a king pin and when used with such constructions with which the guide members might not cooperate the guide members are moved outwardly against the tension of the springs 33 and are swung through 90° to the position shown in dotted lines in Fig. 2.

Many accidents have occurred due to the fact that the king pin on trailer hitches has broken and to overcome this difficulty I provide an auxiliary coupling device which I will now describe.

Secured to the bottom of the support 17 I show a housing 37 which has a flange 38 thereon, which is engaged with the lower face of the support 17. Fastening members 39 hold the flange 38 in place. The housing is provided with a closure 40 held in place by fastening members 41.

The support plate 17 is provided with opposed arcuate slots 42 and with a short arcuate slot 43 which are coaxial with the king pin 21 when the latter is in tractive position. Slidable within the housing 37 I show a ring 44 which at its upper end includes upwardly directed tongues 45 which are arcuate and which extend above the housing 37 and have a sliding fit in the slots 42. The ring 44 also includes a tongue 46 which has a sliding fit in the slot 43. Springs 47 (see Figs. 6 and 8), normally urge the ring 44 upwardly.

When the ring 44 is in the up position as shown in Figs. 6, 7 and 8, the tongues 45 and 46 extend into the groove 25 in the turntable and thus present a rotatable support which will allow the trailer to pivot should the kingpin be broken or even be removed. Upward movement of the turntable is prevented by the engagement of the guide members 32 in the groove 27 in the turntable.

In order to move the ring 44 downwardly and thereby to move the connecting tongues 45 and 46 downwardly against the action of the springs 47 the ring 44 at diametrically opposite locations is provided with a slot 48 in which a rounded head 49 of a crank arm 50 engages. The crank arm 50 is clamped to a shaft 51 by a screw 52 which closes a slot 53 in each crank arm. The crank arms are mounted in bearings 54 which are arranged on bosses 55 which latter are integral with the housing 37. To cause simultaneous movement of the two crank arms I provide a shaft 56 on which an operating arm 57 is mounted. The arm 57 includes an actuating end 58 in which a link 59 is pivoted at one end. The other end of the link is bent as at 60 and engages in a hole 61 in an ear 62. The ear 62 is mounted on one member 63 of a connecting member. The member 63 is internally threaded at 64 to receive the threaded end 65 on the other member 66 of the link. The member 63 is clamped to one of the shafts 51 by a clamping member 67 and the link member 66 is secured to the other shaft 51 by a clamping member 68. The link 63 is secured above the top of its shaft 51 and the link 66 is secured below its shaft 51, so that the shafts 51 move in a reverse direction when rocked by the arm 57, thus the ring 44 is moved up and down when the arm 57 is operated. The construction is such that when the arm 57 is in the position shown in Fig. 11, the arcuate tongues 45 and 46 will be in the position shown in Fig. 6 and will engage in the slot 25 to couple the tractor and trailer together.

When the arm 57 has been moved to the position shown in Fig. 8 the link members 63 and 66 will have been rocked to rock the shafts 51 and cause the portions 49 in the slots 48 to move downwardly below the surface of the support 17.

To lock the arm 57 in the position shown in Fig. 8, I provide a crank arm 69 which is mounted on the shaft 56. One end of the arm 69 includes a crank 70 which carries a pin 71 which makes a pivotal connection with the outer end of a slide 72. The slide 72 is positioned in a groove 73 in the base closure member 40, and extends therein to a point adjacent the opposite inner wall of the housing 37. An upstanding lever 74 extends from the intermediate portion of the slide 72 and is adapted to engage a tab 75 of a trigger 76, which latter is pivoted as at 77 to a locking member 78, as shown in Fig. 6.

The locking member is slidably mounted within the housing 37 and 78 has a transverse base portion 79 and a narrow wedge portion 80 the latter having cam surfaces 81 thereon. A compression spring 82 mounted in the locking member 78 engages the lower surface of the trigger to normally urge the tab 75 into engagement with the lever 74. The base portion 79 is slidably disposed in a groove 83 contained in a pedestal 84, said pedestal being formed integrally with the base 40. The outer periphery of the pedestal 84 is positioned adjacent the inner surface of the ring 44 and is provided with a second groove 85 arranged at right angles to the groove 83.

Slidably disposed in the groove 85 I arrange a pair of locking dogs 86 which, as shown in Fig. 7, are adapted to engage the king pin 21 by means of jaws 87. The dogs 86 are provided with beveled surfaces 88 at the outer edge thereof which are adapted to engage cam surfaces 89 on the upper surface of the tongues 45 to retain the tongues and the ring 44 in a retracted position, as shown in Figs. 9, 10, and 11.

Outward movement of the jaws is affected by action of the cam surfaces 81 of the locking member 78 against cam surfaces 90 on the lower inner surfaces of the dogs 86, the sides of the wedge 80 of the locking member 78 are adapted to be interposed between the inner edges 91 of the dogs, as shown in Fig. 10.

The construction of the locking member 78 and the trigger 76 is such that when the turntable 22 is moved along the inclined surface 18 of the plate 17, the pin 21 will be guided by the guideway 19, thru the groove 83 and into the terminal end 20. When at the end of its movement into the semi-circular portion 20 the lower end of the pin 21 will engage the trigger 76 and will move the trigger to the left in Fig. 6. The trigger carries the pivot pin 77 and the latter is supported on the locking member 78. Thus the locking member is moved to the left in Fig. 6 when the pin engages and moves the trigger 76. This action will move the locking member 78 out of engagement with the inner surfaces of the dogs 86 permitting the springs 47 to force the ring 44 upwardly and, by action of the cam surfaces 89 on the tongues 45 against the beveled surfaces 88, move the dogs inwardly.

In the releasing action the initial movement of the slide 72 and the lever 74 is to rock the trigger 76 about the pivot 77 to dispose the end of the trigger below the lower end of the pin 21 to permit the moving of the locking member 78 intermediate the dogs 86.

In Fig. 13 I show a modification of the invention wherein the parts 17', 22', 25', 40', 45', 51', 52' and 53' are similar to and operate the same as do the parts 17, 22, 25, 40, 45, 51, 52 and 53, previously described. In the modification of Fig. 13, the ring 44' is provided with an external gear rack 100, the teeth of which engage the teeth of a segmental gear 101. The segmental gear is formed on the inner end of the crank arm 50'.

When the shaft 51' is rocked the crank arm 50' will move the ring 44' downwardly to thus move the tongues 45' downwardly.

In Figs. 14 and 15, I show a further modification wherein the parts 17", 18", 19", 20", 22", 27", 28", 44", 45" and 46" are similar to and perform in the same manner as do the parts 17, 18, 19, 20, 22, 27, 28, 44, 45 and 46, previously described. In this modification an upwardly and inwardly semi-circular flange 110 is provided about the forward portion 28" of the plate 17". As shown in Fig. 15, the inwardly directed portion 111 of the flange 110 is adapted to be disposed in the annular groove 27" in the turntable 22" to retain the turntable on the plate.

Having thus described my invention, I claim:

1. In a fifth wheel construction, a support, a turntable engaging the upper surface of said support, said turntable having a circular downwardly open slot therein, said support having a plurality of circumferentially arranged arcuate slots therein, said arcuate slots being coaxial with and aligned with said circular slot and having substantially the same radial width as that of the circular slot, a housing mounted beneath said support and open to the support slots, a ring slidable vertically in said housing and disposed coaxially with the center of the radius of curvature of the slots, spaced tongues carried by the upper surface of said ring and movable in said support slots from a down position below the top of said support to an up position above the top of said support, said tongues being adapted to enter said turntable slot to swivelly mount the turntable on the support, arms pivoted on said support and engaging said ring and adapted to move said ring downwardly, link means pivoted on said support and engaging said arms and adapted to rock said arms to thereby move the ring downwardly, spring means engaging the housing and the ring and normally urging said ring upwardly, opposed locking dogs slidably mounted in the housing for movement in a path above the top of the tongues when the tongues are in down position and movable apart to locking position to engage the tops of the tongues when the tongues are in down position to hold said tongues down, a locking member slidably mounted in the housing, said locking member having cam surfaces thereon engaging said locking dogs and adapted to move the locking dogs to locking position.

2. In a fifth wheel construction, a support, a turntable engaging the upper surface of said support, a housing mounted on said support and disposed beneath said support, said turntable having a circular downwardly open slot therein, said support having a plurality of circumferentially arranged arcuate slots therein, said arcuate slots being coaxial with and aligned with said circular slot and having substantially the same radial width as that of the circular slot, tongues movably carried by said support and movable vertically in said support slots from a down position below the top of said support to an up position above the top of said support, said tongues being adapted to enter said turntable slot to swivelly mount the turntable on the support, arms pivoted on said support and engaging said tongues and adapted to move said tongues downwardly, link means pivoted on said support and engaging said arms and adapted to rock said arms to move the tongues downwardly, spring means engaging the housing and the ring and normally urging said tongues upwardly, lock means movably mounted within said housing for movement in a path above the top of the tongues when the tongues are in down position to engage the tongues when the tongues are in down position and operable to hold said tongues down, means on said support operable to release said lock means, said turntable having a peripheral track portion, spaced guide members slidably mounted on said support adjacent to the edge of said support and movable to engage the track and spring means normally urging the guide members into engagement with the track.

3. In a fifth wheel construction, a planar support having a tapered guideway, a turntable, said turntable having a planar portion engaging said support, a king pin carried by said turntable and adapted to enter said guideway, a housing secured to said support and disposed beneath said support, said turntable having a circular downwardly open slot therein, said support having a pair of opposed, circumferentially arranged, arcuate slots therein, said arcuate slots being coaxial with and aligned with said circular slot and having substantially the same radial width as that of the circular slot, a ring coaxial with said king pin and slidable vertically in said housing, spaced tongues carried by said ring and movable in said support slots from a down position below the top of said support to an up position above said support, said tongues being adapted to enter said turntable slot to swivelly mount the turntable on the support, arms pivoted on said support and engaging said ring and adapted to move said ring downwardly, spring means engaging the housing and the ring and normally urging said ring upwardly, said opposed tongues having downwardly bevelled, inwardly facing, cam surfaces thereon, opposed locking dogs slidably mounted in the housing, said locking dogs being aligned with said tongues, said locking dogs having upwardly bevelled, outwardly facing cam surfaces thereon, said cam surfaces on said tongues engaging the cam surfaces on said locking dogs to force said locking dogs towards each other when the ring and the tongues move upwardly, a locking member slidably mounted in said housing, said locking member having cam surfaces thereon engaging the inner end of said locking dogs and adapted to move the locking dogs to locking position, the inner ends of said locking dogs having opposed jaws adapted to engage the king pin when the jaws are moved towards each other, and a trigger on the locking member and disposed in the path of the king pin as it enters the guideway and operated by movement of the king pin to move the locking member to unlocking position.

4. In a fifth wheel construction, a planar support having an inclined rear end portion and having a tapered guideway terminating in a semi-circular portion, a turntable, said turntable having a planar portion engaging said support, a king pin carried by said turntable and adapted to enter said guideway and to engage in said semi-circular portion, a housing secured to said support and disposed beneath said support, said turntable having a circular downwardly open slot therein, said support having a pair of opposed circumferentially arranged arcuate slots therein, said arcuate slots being coaxial with and aligned with said circular slot and having substantially the same radial width as that of the circular slot, a ring coaxial with said king pin and slidable vertically in said housing, spaced tongues carried by said ring and movable in said support slots from a down position below the top of said support to an up position above said support, said tongues being adapted to enter said turntable slot to swivelly mount the turntable on the support, arms pivoted on said support and engaging said ring and adapted to move said ring downwardly, spring means engaging the housing and the ring and normally urging said ring upwardly, said opposed tongues having downwardly bevelled, inwardly facing, cam surfaces thereon, opposed locking dogs slidably mounted in the housing, said locking dogs being aligned with said tongues, said locking dogs having upwardly beveled, outwardly facing cam surfaces thereon, said cam surfaces on said tongues engaging the cam surfaces on said locking dogs to force said locking dogs towards each other when the ring and the tongues move upwardly, a locking member slidably mounted in said housing, said locking member having cam surfaces thereon engaging the inner end of said locking dogs and adapted to move the locking dogs to locking position, the inner ends of said locking dogs having opposed jaws adapted to engage the king pin when the jaws are moved towards each other, and a trigger mounted on the locking member and disposed in the path of the king pin as it enters the semi-circular portion of said guideway and operated by movement of the king pin to move the locking member to unlocking position.

5. In a fifth wheel construction, a planar support having an inclined rear end portion and having a tapered guideway terminating in a semi-circular portion, a turntable, said turntable having a planar portion engaging said support, a king pin carried by said turntable and adapted to enter said guideway and to engage in said semi-circular portion, a housing secured to said support and disposed beneath said support, said turntable having a circular downwardly open slot therein, said support having a plurality of circumferentially arranged arcuate slots therein, said arcuate slots being coaxial with and aligned with said circular slot and having substantially the same radial width as that of the circular slot, a ring coaxial with said king pin and slidable vertically in said housing, spaced arcuate tongues carried by said ring and movable in said support slots from a down position below the top of said support to an up position above said support, said tongues being adapted to enter said turntable slot to swivelly mount the turntable on the support, arms pivoted on said support and engaging said ring and adapted to move said ring downwardly, spring means engaging the housing and the ring and normally urging said ring upwardly, two of said tongues being diametrically opposed to each other, said opposed tongues having downwardly bevelled, inwardly facing, cam surfaces thereon, opposed locking dogs slidably mounted in the housing, said locking dogs being aligned with said two tongues, said locking dogs having upwardly beveled, outwardly facing cam surfaces thereon, said cam surfaces on said tongues engaging the cam surfaces on said locking dogs to force said locking dogs towards each other when the ring and the tongues move upwardly, a locking member slidably mounted in said housing, said locking member having cam surfaces thereon engaging the inner end of said locking dogs and adapted to move the locking dogs to locking position, the inner ends of said locking dogs having opposed jaws adapted to engage the king pin when the jaws are moved towards each other, and a trigger pivotally mounted on the locking member and disposed in the path of the king pin as it enters the semi-circular portion of said guideway and operated by movement of the king pin to move the locking member to unlocking position.

WILLIAM A. NORRIS.

References Cited in the file of this patent

UNITED STATES PATENTS

| Number | Name | Date |
|---|---|---|
| 655,836 | Smith | Aug. 14, 1900 |
| 1,799,846 | Greer | Apr. 7, 1931 |
| 1,892,797 | Davis | Jan. 3, 1933 |
| 2,072,661 | Walther et al. | Mar. 2, 1937 |
| 2,166,308 | Logan | July 18, 1939 |
| 2,294,710 | Berg et al. | Sept. 1, 1942 |
| 2,450,201 | Logan | Sept. 28, 1948 |
| 2,462,211 | Moore | Feb. 22, 1949 |